(12) United States Patent
Andrasko et al.

(10) Patent No.: US 9,733,645 B1
(45) Date of Patent: Aug. 15, 2017

(54) SYSTEM AND METHOD FOR CONTROLLING HANDLING OF A MARINE VESSEL

(71) Applicant: Brunswick Corporation, Lake Forest, IL (US)

(72) Inventors: Steven J. Andrasko, Oshkosh, WI (US); Jason S. Arbuckle, Horicon, WI (US); Aaron J. Ward, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 358 days.

(21) Appl. No.: 14/484,702

(22) Filed: Sep. 12, 2014

(51) Int. Cl.
*B63H 23/02* (2006.01)
*G05D 1/02* (2006.01)
*B63H 25/02* (2006.01)

(52) U.S. Cl.
CPC ........... *G05D 1/0206* (2013.01); *B63H 25/02* (2013.01); *B63H 2025/022* (2013.01)

(58) Field of Classification Search
CPC .............................. G05D 1/0206; B63H 25/02
See application file for complete search history.

(56) References Cited

U.S. PATENT DOCUMENTS

| | | | |
|---|---|---|---|
| 5,129,345 A * | 7/1992 | Senften | B63B 43/18 114/144 E |
| 6,273,771 B1 | 8/2001 | Buckley et al. | |
| 6,363,875 B1 * | 4/2002 | Griffith, Sr. | B63H 5/08 114/151 |
| 7,267,068 B2 | 9/2007 | Bradley et al. | |
| 7,398,742 B1 | 7/2008 | Gonring | |
| 8,145,370 B2 | 3/2012 | Borrett | |
| 8,145,371 B2 * | 3/2012 | Rae | B63H 11/107 701/21 |
| 8,480,445 B2 | 7/2013 | Morvillo | |
| 2005/0170713 A1 | 8/2005 | Okuyama | |
| 2005/0227553 A1 * | 10/2005 | Arvidsson | B63H 25/42 440/80 |

(Continued)

OTHER PUBLICATIONS

U.S. Appl. No. 14/200,831, filed Mar 7, 2014.

(Continued)

*Primary Examiner* — Truc M Do
*Assistant Examiner* — Jess Whittington
(74) *Attorney, Agent, or Firm* — Andrus Intellectual Property Law, LLP

(57) ABSTRACT

A system and method are for controlling handling of a marine vessel having a steerable component that is steerable to a plurality of positions to vary a direction of movement of the vessel. A controller is communicatively connected to an actuator of the steerable component and a user input device provides to the controller an operator-initiated steering command to steer the steerable component to one of the plurality of positions. A sensor provides to the controller an indication of an undesired course change of the marine vessel. The controller has a vessel direction control section that outputs a command to the actuator to change a position of the steerable component from the one of the plurality of positions so as to automatically counteract the undesired course change. The vessel direction control section is active only when the operator-initiated steering command is less than or equal to a predetermined threshold.

20 Claims, 3 Drawing Sheets

(56) References Cited

U.S. PATENT DOCUMENTS

| | | | | |
|---|---|---|---|---|
| 2007/0089660 A1* | 4/2007 | Bradley | ............... | B63H 25/42 |
| | | | | 114/144 A |
| 2008/0284574 A1* | 11/2008 | Bosch | ............... | B60G 17/019 |
| | | | | 340/438 |
| 2010/0094491 A1* | 4/2010 | Oehlgrien | ............ | B63B 39/061 |
| | | | | 701/21 |
| 2011/0028057 A1* | 2/2011 | Torrangs | ............... | B63H 20/12 |
| | | | | 440/53 |
| 2011/0153126 A1* | 6/2011 | Arbuckle | ............. | B63H 21/22 |
| | | | | 701/21 |
| 2013/0245892 A1* | 9/2013 | Chen | ..................... | B62D 6/002 |
| | | | | 701/42 |
| 2015/0025745 A1* | 1/2015 | Tamura | ................. | B62D 5/046 |
| | | | | 701/41 |

OTHER PUBLICATIONS

U.S. Appl. No. 11/965,583, filed Dec. 27, 2007.
U.S. Appl. No. 14/177,762, filed Feb. 11, 2014.
U.S. Appl. No. 13/829,048, filed Mar. 14, 2013.

* cited by examiner

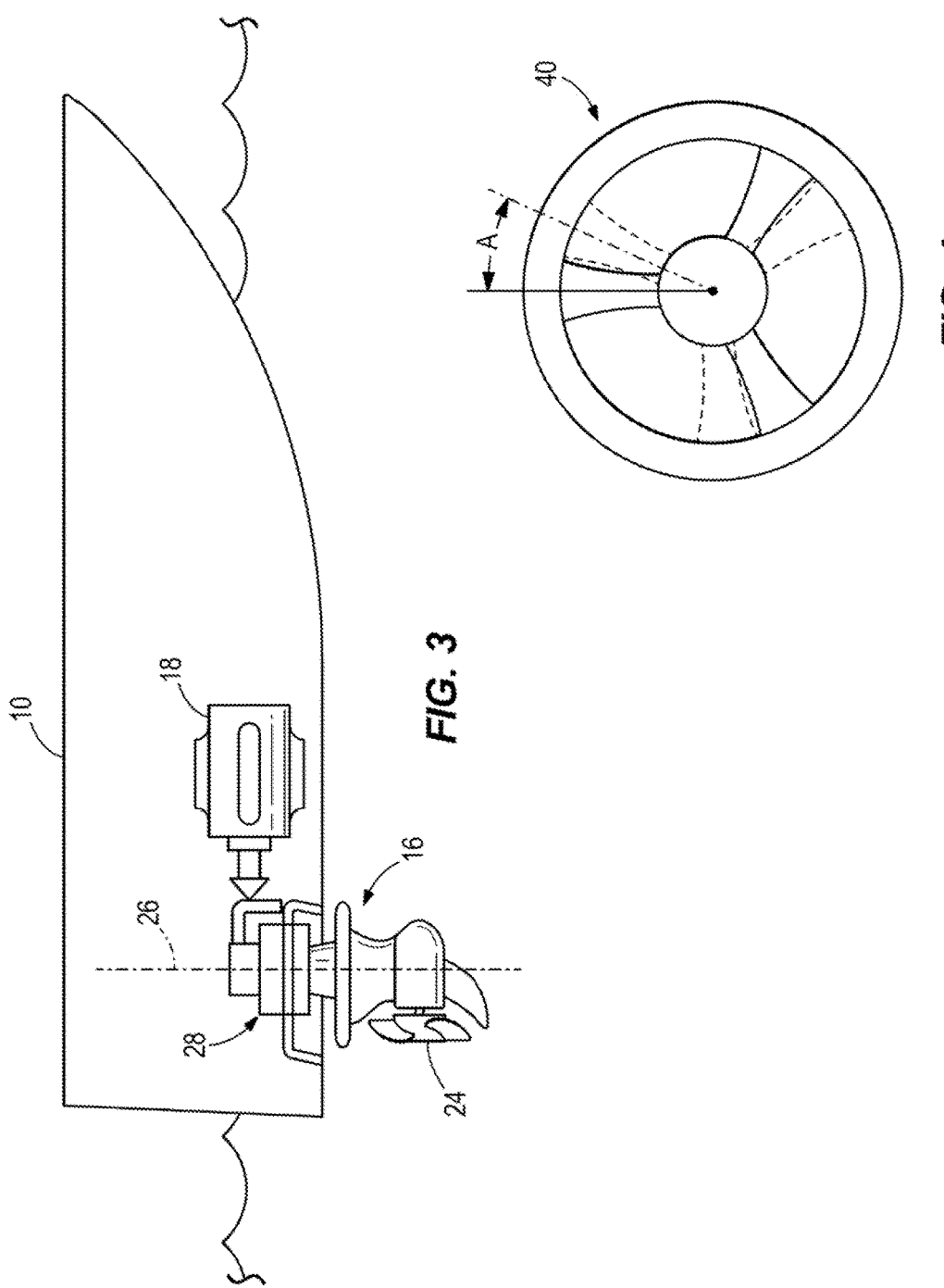

SYSTEM AND METHOD FOR CONTROLLING HANDLING OF A MARINE VESSEL

FIELD

The present disclosure relates to systems and methods for controlling handling of a marine vessel. More specifically, the present disclosure relates to steering and direction control of marine vessels.

BACKGROUND

U.S. Pat. No. 6,273,771 discloses a control system for a marine vessel incorporating a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 7,398,742 discloses a steering assist system that provides differential thrusts by two or more marine propulsion devices in order to create a more effective turning moment on a marine vessel. The differential thrusts can be selected as a function of the magnitude of turn commanded by an operator of the marine vessel and, in addition, as a function of the speed of the marine vessel at the time when the turning command is received.

Each of the above patents is hereby incorporated by reference herein in its entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for controlling handling of a marine vessel comprises a steerable component coupled to the marine vessel and steerable to a plurality of positions so as to vary a direction of movement of the marine vessel. A controller is communicatively connected to an actuator of the steerable component and a user input device provides to the controller an operator-initiated steering command to steer the steerable component to one of the plurality of positions. A sensor provides to the controller an indication of an undesired course change of the marine vessel. The controller has a vessel direction control section that outputs a command to the actuator to change a position of the steerable component from the one of the plurality of positions so as to automatically counteract the undesired course change. The vessel direction control section is active only when the operator-initiated steering command is less than or equal to a predetermined threshold.

Also disclosed is a method for controlling handling of a marine vessel having a steerable component steerable to a plurality of positions so as to vary a direction of movement of the marine vessel. The method comprises receiving an operator-initiated steering command and outputting a command to an actuator to steer the steerable component to one of the plurality of positions that corresponds to the operator-initiated steering command. The method also includes receiving an indication of an undesired course change of the marine vessel from a sensor. The method comprises determining if the operator-initiated steering command is less than or equal to a predetermined threshold, and if the operator-initiated steering command is less than or equal to the predetermined threshold, outputting a command to the actuator to change the position of the steerable component from the one of the plurality of positions so as to automatically counteract the undesired course change.

BRIEF DESCRIPTION OF THE DRAWINGS

The present disclosure is described with reference to the following Figures. The same numbers are used throughout the Figures to reference like features and like components.

FIG. 3 illustrates a schematic cross-sectional side view of a marine vessel according to the present disclosure.

FIG. 4 illustrates an exemplary user input device for providing an operator-initiated steering command to the steerable component(s) of the marine vessel.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
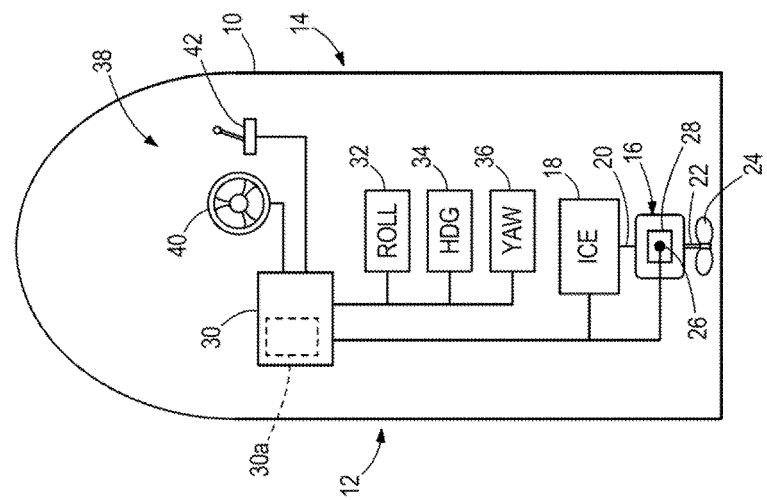
FIG. 1 illustrates a schematic view of a marine vessel according to the present disclosure.

FIG. 1 illustrates a marine vessel 10 having a port side 12 and a starboard side 14. A steerable component 16 is located proximate a stern of the marine vessel 10. Referring also to FIG. 3, in the example shown, the steerable component 16 is a pod drive; however, the steerable component 16 could comprise any of an outboard motor, a stern drive, or a jet drive. Alternatively, if the marine vessel 10 were provided with an inboard drive, the steerable component 16 could be a rudder. The steerable component 16 is coupled in torque transmitting relationship with an internal combustion engine 18 via an output shaft 20. The steerable component 16 includes a propeller shaft 22 that connects to a propeller 24. When torque is transmitted from the internal combustion engine 18 via the shaft 20 to the propeller shaft 22 and the propeller 24, a thrust is produced to propel the marine vessel 10 in a direction that corresponds to a steering position of the steerable component 16.

In the example of FIGS. 1 and 3, the steerable component 16 is steerable around a vertical steering axis 26, it being understood that different types of marine vessels and steerable components may have steering axes that are not vertically aligned. The steering axis 26 runs through a steering actuator 28, which actuates the steerable component 16 to one of a plurality of positions so as to control direction of movement of the marine vessel 10.

The internal combustion engine 18 and the steering actuator 28 are communicatively connected to a controller 30. The controller 30 has a memory and a programmable processor. As is conventional, the processor can be communicatively connected to a computer readable medium that includes volatile or nonvolatile memory upon which computer readable code is stored. The processor can access the computer readable code on the computer readable medium, and upon executing the code carries out the functions as described herein. Also connected to the controller 30 are a roll sensor 32, a heading sensor 34, and a yaw rate sensor 36, the purpose and function of which will be described further herein below. In one example, the roll sensor 32, heading sensor 34, and yaw rate sensor 36 are combined into one unit known as an attitude and heading reference system (AHRS) that provides 3D orientation of the marine vessel 10 by integrating gyroscopic measurements, accelerometer data, and magnometer data. In alternative embodiments, a gyroscope, motion reference unit (MRU), inertial measurement unit (IMU), electronic compass, or any combination of the above-mentioned devices could instead be used to sense one or more of the roll, heading, and yaw rate of the marine vessel 10.

The controller 30 is also communicatively connected to user input devices 38 for providing an operator-initiated steering command. The user input devices 38 include, but are not limited to, a steering wheel 40 and a joystick 42. It should be understood that either the steering wheel 40 or the joystick 42 could be eliminated, and the other of the devices used as the sole user input device 38 for initiating steering commands to steer the steerable component 16.

In the example shown, the controller 30 includes a vessel direction control section 30a, which includes software that is programmed to carry out the functions and methods described herein below. It should be understood that a separate vessel direction control section 30a need not be provided, and is shown here schematically for purposes of describing the specific functions and methods it is programmed to carry out.

Figure 2:
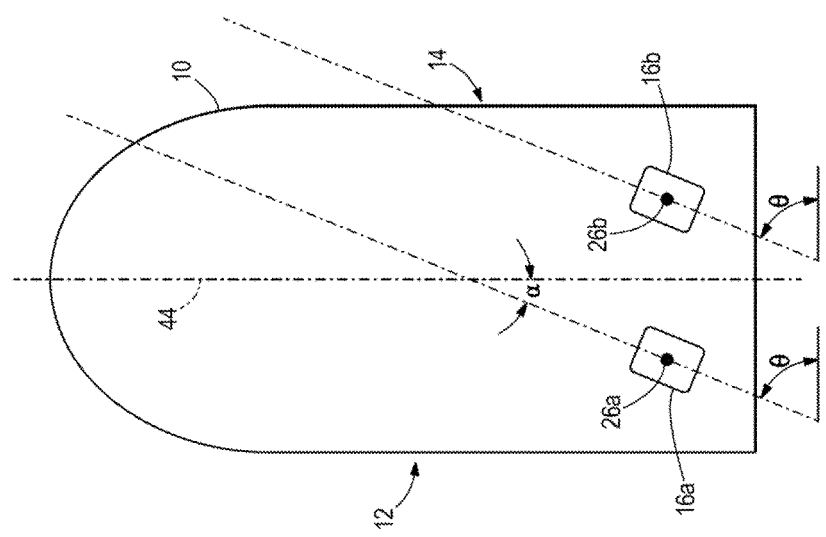
FIG. 2 illustrates a schematic view of a marine vessel having two steerable components, and the steering angles of the steerable components.

Now referring to FIG. 2, the capability of the steerable component 16 to be steered to a plurality of positions will be described. FIG. 2 illustrates two steerable components 16a, 16b. Both of the steerable components could comprise pod drives, or could comprise any of the other steerable components mentioned herein above. It should be understood that the principles discussed herein with reference to the two steerable components 16a, 16b are equally applicable to the single steerable component 16 of FIG. 1, unless noted as otherwise. The principles discussed herein also apply when more than two steerable components are provided on the marine vessel 10, and the number of steerable components is not limiting on the scope of the present disclosure. As shown in FIG. 2, both of the steerable components 16a, 16b are steered around their vertical steering axes 26a, 26b to a steering angle of $\ominus$, where $\ominus$ is related to a virtual center line 44 of the marine vessel 10 according to the equation $\ominus = 90 - \alpha$, where $\alpha$ is an angle of a thrust vector produced by a propeller associated with each steerable component 16a, 16b with respect to the virtual center line 44.

Referring now also to FIG. 4, a certain degree of actuation of a user-input device, such as the steering wheel 40 shown, will correspond to a particular steering angle $\ominus$ of the steerable components 16, 16a, 16b, according to a drive angle map stored in the memory of the controller 30. For example, if the steering wheel 40 is turned from a center (or straight-ahead) position shown in solid lines by an angle A (or percentage of total allowable wheel angle) to the position shown in dashed lines, this angle (or percentage) A maps to a particular steering angle $\ominus$ of the steerable components 16, 16a, 16b. For ease of explanation, the steerable components 16a, 16b are assumed to be turned to the same steering angle $\ominus$ mapped from the position of the steering wheel 40, although it should be understood that in some embodiments, the steerable components 16a, 16b are instead steered to independently-calculated steering angles that are meant to achieve a particular movement of the marine vessel 10. Although a steering wheel 40 is shown in FIG. 4 for exemplary purposes, movement of the joystick 42 around its axis could also be mapped to a particular steering angle $\ominus$ of the steerable components 16, 16a, 16b.

Through research and development, the present inventors have realized that many marine vessels are susceptible to steering loads imparted on the vessel by external forces such as cross winds, currents, uneven loading of the marine vessel, differential tab deployment, etc. These external forces cause an undesired course change of the marine vessel 10, forcing the operator of the marine vessel 10 to continuously correct the vessel's course using one of the user input devices 38 so as to maintain a desired straight-ahead heading. This constant need for correction can be tiring and stressful for the operator, and may lessen the enjoyment of boating. Another undesirable effect of the external forces is that the steering wheel 40 is rarely in the straight-ahead position shown in full lines in FIG. 4 when the marine vessel 10 is actually going straight ahead.

Current controller software calibration is able to account for hooks in the running surface of the marine vessel 10, uneven port-starboard weight distribution that is a permanent part of a vessel's layout, or other permanent sources of un-true running behavior. However, current controller software calibration is not able to take account of changing external forces on the marine vessel 10. The system and method of the present disclosure correct for undesired course changes of the marine vessel 10 caused by real-time disturbances to the handling of a marine vessel 10 due to the changing external forces described above.

The present disclosure provides a system for controlling handling of a marine vessel 10. The system comprises a steerable component 16 coupled to the marine vessel 10 and steerable to a plurality of positions so as to vary a direction of movement of the marine vessel 10. A controller 30 is communicatively connected to an actuator 28 of the steerable component 16. A user input device 38 provides to the controller 30 an operator-initiated steering command to steer the steerable component 16 to one of the plurality of positions. A sensor provides to the controller 30 an indication of an undesired course change of the marine vessel 10, such as for example due to the external forces described herein above. In one example, the sensor is a yaw rate sensor 36 that provides an indication that the marine vessel 10 is undesirably yawing and therefore changing course. In another example, the sensor is a heading sensor 34 that provides an indication that the heading of the marine vessel 10 is undesirably changing and therefore changing course.

The controller 30 has a vessel direction control section 30a that outputs a command to the actuator 28 to change a position of the steerable component 16 from the one of the plurality of positions (corresponding to the operator-initiated steering command) so as to automatically counteract the undesired course change. In other words, the vessel direction control section 30a might cause the steerable components 16, 16a, 16b to change from their steering angle ⊖ that was mapped from the drive angle map so as to put the vessel back on course. According to the present disclosure, the vessel direction control section 30a is active only when the operator-initiated steering command is less than or equal to a predetermined threshold. For example, the controller 30 may determine that the operator-initiated steering command is within a predetermined threshold when the angle (or percentage) A of the steering wheel 40 is less than a predetermined magnitude. Magnitude is used so that both clockwise (positive) and counterclockwise (negative) movements of the steering wheel 40 are accounted for. In contrast, when the operator of the marine vessel 10 requests a turn outside of the predetermined threshold, the system and method of the present disclosure provide an expected response of the steerable component 16 according to the above-described drive angle map no matter whether external forces are affecting the vessel's course or not. In other words, the vessel direction control section 30a does not change the position of the steerable component 16 to automatically counteract an undesired course change when the operator-initiated steering command is greater than the predetermined threshold.

In one example, the sensor is a yaw rate sensor 36 that provides a sensed actual yaw rate of the marine vessel 10. The vessel direction control section 30a in this example is a yaw rate control section that compares the sensed actual yaw rate to a predetermined desired yaw rate and outputs a command to change the position of the steerable component 16 so as to achieve the predetermined desired yaw rate. The predetermined desired yaw rate may be zero when the operator-initiated steering command is straight-ahead, and may be non-zero when the operator-initiated steering command is a non-zero value. In one example, a PID controller may generate a yaw moment request based on a difference between the predetermined desired yaw rate and the actual, measured yaw rate. The yaw moment request may then be interpreted by a steerable component controller to output a steerable component actuation request to the steering actuator 28 so as to achieve the yaw moment. The yaw rate control section may also output commands regarding throttle level and/or gear of the engine 18 that will help achieve the yaw moment.

In another example, the sensor is a heading sensor 34 that provides a sensed actual heading or course of the marine vessel 10. The vessel direction control section 30a in this example is a heading control section that compares the sensed actual heading and/or course to a predetermined desired heading and outputs a command to change the position of the steerable component 16 so as to achieve the predetermined desired heading. The predetermined desired heading may be zero when the operator-initiated steering command is straight-ahead, and may be non-zero when the operator-initiated steering command is a non-zero value. In one example, the actual heading and/or course may be provided to an error calculator within the heading control section, which compares the predetermined desired heading to the actual heading and/or course of the marine vessel 10. This comparison produces a difference magnitude which is defined in terms of a heading angular difference. This information is provided to an error calculator, which resolves the value into a heading change in reference to clockwise and counterclockwise movement of the marine vessel 10. The error is provided to a PID controller, which can in turn output an actuation request to achieve a desired position of the steerable component 16 and/or to set throttle level and gear of the engine 18.

The present system differs from a general auto-heading (or autopilot) system in that the system of the present disclosure is engaged only when the marine vessel 10 is not in an autopilot heading hold mode. Similarly, the system of the present disclosure may be configured such that the vessel direction control section 30a carries out the presently-disclosed method only when the marine vessel 10 is not in a waypoint tracking mode. In other words, the system of the present disclosure is engaged only when the operator is engaged in manual steering, via the steering wheel 40, joystick 42, or other user input device 38. As described above, it is while the operator of the marine vessel 10 is steering the marine vessel 10 with a manually-operated user input device 38 that changing external forces on the marine vessel have an effect on handling, and the operator must continually adjust the user input device 38 to counteract the effects of the external forces on the vessel's course.

Other enable requirements may be set for the vessel direction control section 30a. For example, the vessel direction control section 30a may be active only when the user input device 38 has provided an operator-initiated steering command of straight-ahead for longer than a predetermined period of time, for example, five seconds. Additionally, the vessel direction control section 30a may be active only when the marine vessel 10 is on plane, or has reached a certain speed. The vessel direction control section 30a may be active only when an actual roll angle of the marine vessel 10, as measured by the roll sensor 32, is less than a predetermined roll angle, thereby ensuring that the marine vessel 10 is somewhat level with respect to the surface of the water in which it is operating. In one example, the marine vessel 10 must be within ±2% of a desired roll angle in order for the vessel direction control section 30a to be activated. Each of these enable requirements may be utilized together to ensure that the operator of the marine vessel 10 has achieved the speed, direction, and attitude of the marine vessel 10 at which he wishes to remain for a period of time. In one example, each of these conditions must be true for a minimum dwell time, for example five seconds, before the vessel direction control section 30a becomes active. In other examples, only one or various combinations of the enable requirements must be true in order to activate the vessel direction control section 30a.

The present system is calibrated such that when the vessel direction control section 30a is activated, a certain amount or degree of correction to the steering angle ⊖ of the steerable component 16 is allowed based on a magnitude of the operator-initiated steering command from the user input device 38. The response of the system to varying degrees of actuation of the user input device 38 may be blended out as the operator-initiated steering command changes from a straight-ahead steering command to a command that is equal to the predetermined threshold. For example, the system may be programmed such that the vessel direction control section 30a can change the position of the steerable component 16 to automatically counteract an undesired course change by up to progressively decreasing predetermined amounts as the operator-initiated steering command approaches the predetermined threshold. In one example, a table of the calibration is as follows:

| Steering Command (%) | Steering Angle Correction Allowed (degrees) |
|---|---|
| 0 | 5.0 |
| 2 | 4.0 |
| 4 | 3.0 |
| 5 | 2.63 |
| 6 | 2.43 |
| 10 | 1.7 |
| 12 | 1.32 |
| 14 | 1.0 |
| 18 | 0.5 |
| 21 | 0.25 |
| 25 | 0 |

The above values are for exemplary purposes only and are not meant to limit the scope of the present disclosure. In the exemplary calibration provided above, at 0% wheel input (i.e., angle A in FIG. 4 equals 0), ±5° of steerable component correction is allowed. Referring to FIG. 2, this means that the steerable components 16a, 16b can be steered to angles of $\ominus$±5° in order to correct for any unwanted course change of the marine vessel 10. The entire ±5° of steering angle correction need not be used if it is not necessary to correct the course of the marine vessel 10. Rather, the values in the right-hand column of the table above represent limits of allowable steering angle change that are available to correct the vessel's course. Continuing with the example, at ±6% of total allowable wheel input, the algorithm of the present disclosure allows the steerable components 16a, 16b to be moved by ±2.43° in order to correct undesired course change. In other words, the steering angles of the steerable components 16a, 16b can be $\ominus$±2.43°. Moving on to ±25% of total allowable wheel input, the algorithm of the present disclosure allows 0° of correction to the steering angles of the steerable components 16a, 16b. In other words, the vessel direction control section 30a has no authority to change the steering angle of the steerable component 16 to correct an undesired course change of the marine vessel 10. Rather, the steerable component 16 will be positioned at the angle $\ominus$ that is read from the drive angle map, and that corresponds directly to the operator-initiated steering command from the user input device 38. According to the above example, any value of wheel input above 25% will also map directly to a steering angle $\ominus$, with no automatic correction of the position of the steerable component 16 allowed. In this example, ±25% of total allowable wheel input represents the above-mentioned predetermined threshold, but other thresholds could be used.

In one example, the authority of the vessel direction control section 30a to automatically change the steering angle $\ominus$ to correct vessel course is blended in from zero authority to the value of authority provided in right-hand column of the above table over a calibratable period of time, for example seven seconds, to ensure that there is no abrupt or sudden change in the steering angle $\ominus$ of the steerable component 16. For example, at 0% wheel input, the authority may be blended from 0° to ±5° linearly over 7 seconds (i.e. increase by 5/7 of a degree per second).

As described above, the amount of correction required to the steering angle $\ominus$ of the steerable component 16 depends on a difference between the actual vessel yaw rate or heading and the desired vessel yaw rate or heading. After the controller 30 uses the error in yaw rate or heading to calculate a desired amount of correction to the steering angle of the steerable component 16, the vessel direction control section 30a determines whether this amount of steering angle correction is allowed. In the above example, if the steering wheel is turned by 5%, even if the controller 30 indicates that a steering angle correction of 3° would be required in order to obtain the desired yaw rate or desired heading, the vessel direction control section 30a will only allow ±2.63° of correction to the steering angle $\ominus$. In this example, the controller 30 will map the 5% operator-initiated steering command to a steering angle $\ominus$, say for example, 10°, and will use this angle as a feed forward value in the yaw rate or heading controller. If a yaw rate controller is used, the controller 30 will use a map to determine a yaw rate that corresponds to the 5% operator-initiated steering command, and will set this yaw rate as the desired yaw rate. If a heading controller is used, the controller 30 will use a map to determine a yaw rate that corresponds to the 5% operator-initiated steering command, and will integrate this yaw rate to determine the desired heading. The controller 30 will next determine if yaw rate or heading change not attributable to the operator-initiated steering command (i.e., yaw rate error or heading error) is present. If so, according to the example, the vessel direction control section 30a will allow ±2.63° of steering angle correction to correct the course of the marine vessel 10.

In one example, when two steerable components 16a, 16b are provided as in FIG. 2, the steering angle $\ominus$ of each of the steerable components 16a, 16b need not be adjusted by the same angular amount. For example, the controller 30 may indicate that one of the steerable components 16a, 16b can be steered to a different angle than the other, perhaps in combination with different magnitude thrusts being produced by a propeller associated with one or the other, in order to rectify the error in yaw rate or heading. For example, if a strong wind is coming from port 12, the drive angles $\ominus$ of the steerable components 16a, 16b may be decreased (i.e., the steerable components 16a, 16b may be rotated clockwise as shown) so as to counteract the external force from port 12. In one example, the steering angle $\ominus$ of the steerable component 16b may be decreased more than the steering angle $\ominus$ of the steerable component 16a, or vice versa, depending on an algorithm stored in the controller 30 for determining the most efficient way to effect a turning moment on the marine vessel 10.

Figure 5:
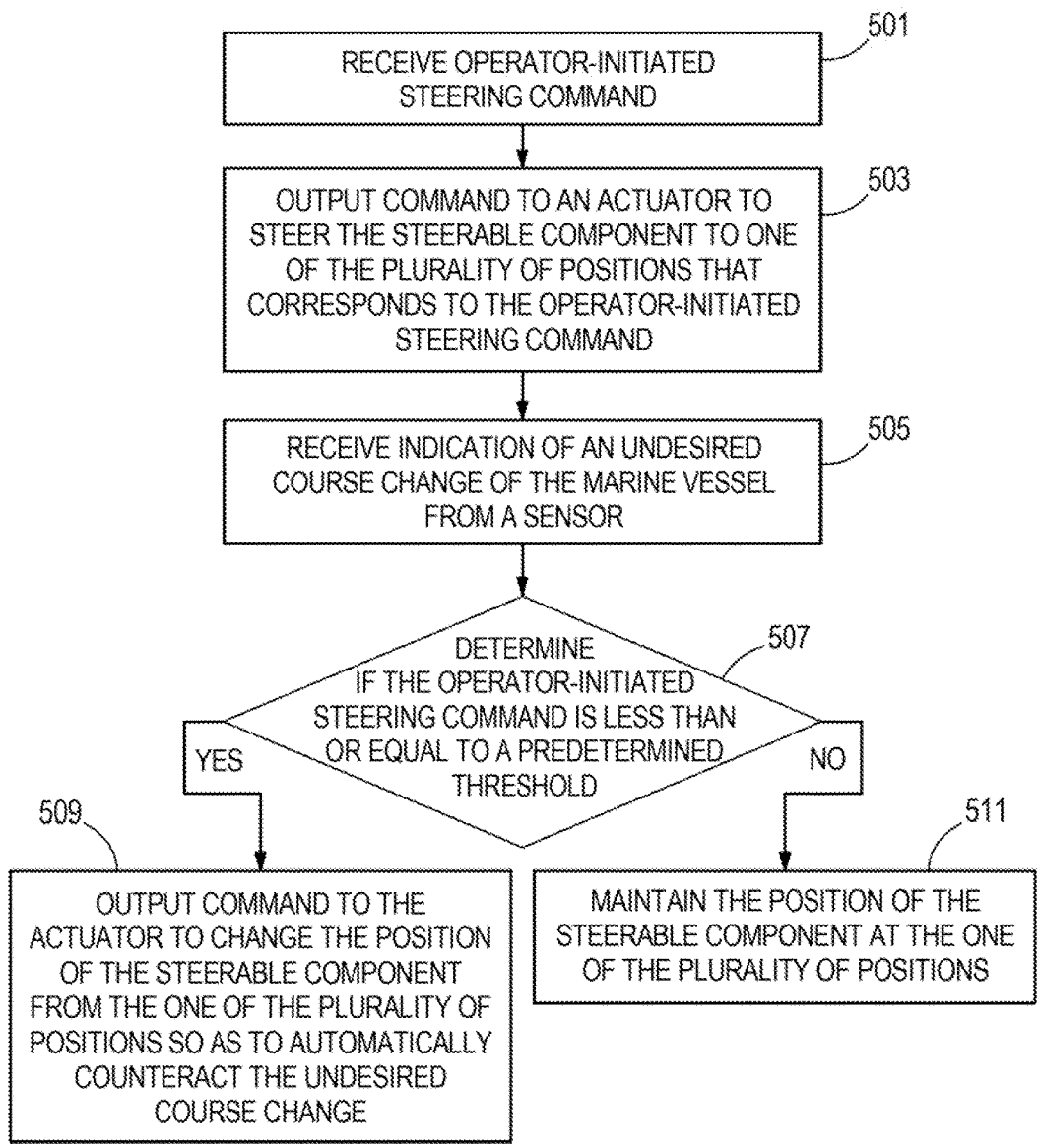
FIG. 5 illustrates a method for controlling handling of a marine vessel according to one example of the present disclosure.

Now turning to FIG. 5, a method for controlling movement of a marine vessel 10 having a steerable component 16 steerable to a plurality of positions so as to vary a direction of movement of the marine vessel 10 will be described. As shown at 501, the method includes receiving an operator-initiated steering command. At 503, the method includes outputting a command to a steering actuator 28 to steer the steerable component 16 to one of the plurality of positions that corresponds to the operator-initiated steering command. In one example, the position of the steerable component 16 is straight ahead ($\ominus$=90°) to correspond with a straight ahead (A=0) position of a steering wheel 40. At 505, the method includes receiving an indication of an undesired course change of the marine vessel 10 from a sensor. In one example, the method includes receiving the indication of the undesired course change from a yaw rate sensor 36. In another example, the method includes receiving the indication of the undesired course change from a heading sensor 34.

As shown at 507, the method also includes determining if the operator-initiated steering command is less than or equal to a predetermined threshold. In one example, this threshold may be ±25% of potential allowable steering wheel input. If yes at 507, the method may include outputting a command to the steering actuator 28 to change the position of the steerable component 16 from the one of the plurality of positions so as to automatically counteract the undesired course change. For example, the steerable component 16 might be moved from ⊖=90° to ⊖=90°±5° depending on how great the course change is. In one example, the method further comprises changing the position of the steerable component 16 to counteract the undesired course change by up to progressively decreasing predetermined amounts as the operator-initiated steering command approaches the predetermined threshold. If no at 507, then the operator-initiated steering command is greater than the predetermined threshold, and the method may include maintaining the position of the steerable component 16 at the one of the plurality of positions even in the presence of an undesired course change, as shown at 511.

In one example, the method further comprises carrying out the method only when the marine vessel is not in an autopilot heading hold mode, only when the operator-initiated steering command has been straight-ahead for longer than a predetermined period of time, only when the marine vessel 10 is on plane, and/or only when an actual roll angle of the marine vessel 10 is less than a predetermined roll angle, as determined by a roll sensor 32. Various combinations of these conditions may be used as enable criteria for the method of the present disclosure.

The presently disclosed system and method are therefore provided with the most authority to change the angle of the steerable component 16 when the operator of the marine vessel 10 has the steering wheel 40 (or other user input device 38) at a nearly centered position, indicating that the operator wishes to drive the vessel straight-ahead. A predetermined threshold of the operator-initiated steering command may be set, and as the limits of this predetermined threshold are approached, the vessel direction control section 30a may provided with decreasing amounts of authority (plus or minus a calibrated angular amount) to change the position of the steerable component 16 to counteract undesired course changes. The yaw rate or heading of the marine vessel 10 is continually monitored to determine whether it requires correction by re-positioning of the steerable component 16. While this is happening, the operator of the marine vessel 10 has no idea that the yaw or heading controller is working, i.e. the user input device 38 is not detented. Once the operator moves the user input device 38 enough that the operator-initiated steering command exceeds the predetermined threshold, no steering angle correction is allowed.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A system for controlling handling of a marine vessel, the system comprising:
   a steerable component coupled to the marine vessel and steerable to a plurality of positions so as to vary a direction of movement of the marine vessel;
   a controller communicatively connected to an actuator of the steerable component;
   a user input that provides to the controller an operator-initiated steering command to steer the steerable component to one of the plurality of positions; and
   a sensor that provides to the controller an indication of an undesired course change of the marine vessel;
   wherein the controller has a vessel direction control section which, in response to the indication of the undesired course change, outputs a command to the actuator to change a position of the steerable component from the one of the plurality of positions to automatically counteract the undesired course change;
   wherein the vessel direction control section is active only when the operator-initiated steering command is less than or equal to a predetermined threshold.

2. The system of claim 1, wherein the vessel direction control section does not change the position of the steerable component to automatically counteract the undesired course change when the operator-initiated steering command is greater than the predetermined threshold.

3. The system of claim 2, wherein the vessel direction control section can change the position of the steerable component to automatically counteract the undesired course change by up to progressively decreasing predetermined amounts as the operator-initiated steering command approaches the predetermined threshold.

4. The system of claim 1, wherein the sensor is a yaw rate sensor that provides a sensed actual yaw rate of the marine vessel, and the vessel direction control section is a yaw rate control section that compares the sensed actual yaw rate to a predetermined desired yaw rate and outputs the command to change the position of the steerable component to achieve the predetermined desired yaw rate.

5. The system of claim 1, wherein the sensor is a heading sensor that provides a sensed actual heading of the marine vessel, and the vessel direction control section is a heading control section that compares the sensed actual heading to a predetermined desired heading and outputs the command to change the position of the steerable component to achieve the predetermined desired heading.

6. The system of claim 1, wherein the vessel direction control section is active only when the marine vessel is not in an autopilot heading hold mode.

7. The system of claim 6, wherein the vessel direction control section is active only when the operator-initiated steering command provided by the user input has been straight-ahead for longer than a predetermined period of time.

8. The system of claim 7, wherein the vessel direction control section is active only when the marine vessel is on plane.

9. The system of claim 8, further comprising a roll sensor that determines an actual roll angle of the marine vessel, wherein the vessel direction control section is active only when the actual roll angle of the marine vessel is less than a predetermined roll angle.

10. The system of claim 1, wherein a steering wheel provides the user input and the operator-initiated steering command is a steering wheel angle.

11. The system of claim 1, wherein the steerable component is a pod drive.

12. A method for controlling handling of a marine vessel having a steerable component steerable to a plurality of positions so as to vary a direction of movement of the marine vessel, the method comprising:

receiving an operator-initiated steering command;

outputting a command to an actuator to steer the steerable component to one of the plurality of positions that corresponds to the operator-initiated steering command;

receiving an indication of an undesired course change of the marine vessel from a sensor;

determining if the operator-initiated steering command is less than or equal to a predetermined threshold; and in response to receiving the indication of the undesired course change and to the operator-initiated steering command being less than or equal to the predetermined threshold, outputting a command to the actuator to change the position of the steerable component from the one of the plurality of positions to automatically counteract the undesired course change.

13. The method of claim 12, further comprising maintaining the steerable component at the one of the plurality of positions if the operator-initiated steering command is greater than the predetermined threshold.

14. The method of claim 13, further comprising changing the position of the steerable component to counteract the undesired course change by up to progressively decreasing predetermined amounts as the operator-initiated steering command approaches the predetermined threshold.

15. The method of claim 12, further comprising carrying out the method only when the marine vessel is not in an autopilot heading hold mode.

16. The method of claim 15, further comprising carrying out the method only when the operator-initiated steering command has been straight-ahead for longer than a predetermined period of time.

17. The method of claim 16, further comprising determining if the marine vessel is on plane and carrying out the method only when the marine vessel is on plane.

18. The method of claim 17, further comprising measuring an actual roll angle of the marine vessel and carrying out the method only when the actual roll angle of the marine vessel is less than a predetermined roll angle.

19. The method of claim 12, further comprising receiving the indication of the undesired course change from a yaw rate sensor.

20. The method of claim 12, further comprising receiving the indication of the undesired course change from a heading sensor.

\* \* \* \* \*